United States Patent [19]

Denenberg et al.

[11] Patent Number: 5,521,984
[45] Date of Patent: May 28, 1996

[54] SYSTEM FOR REGISTRATION, IDENTIFICATION AND VERIFICATION OF ITEMS UTILIZING UNIQUE INTRINSIC FEATURES

[75] Inventors: Stuart Denenberg, San Francisco; Robert Petersen, Dublin; John Densberger, Livermore; John J. Christensen, Manteca, all of Calif.

[73] Assignee: Verification Technologies, Inc., San Francisco, Calif.

[21] Appl. No.: 75,149

[22] Filed: Jun. 10, 1993

[51] Int. Cl.⁶ .................................................. G06K 9/00
[52] U.S. Cl. .................................... 382/209; 382/100
[58] Field of Search ................................. 382/1, 2, 4, 5; 340/825.3

[56] References Cited

U.S. PATENT DOCUMENTS

| | | |
|---|---|---|
| 3,778,781 | 12/1973 | Roth ................................. 340/172.5 |
| 4,128,850 | 12/1978 | Fischer, II .............................. 382/4 |
| 4,414,546 | 11/1983 | Taylor et al. ............................ 382/2 |
| 4,423,415 | 12/1983 | Goldman ........................... 340/825.34 |
| 4,661,983 | 4/1987 | Knop ..................................... 382/1 |
| 4,699,149 | 10/1987 | Rice ...................................... 382/2 |
| 4,776,020 | 10/1988 | Kosaka et al. ........................... 382/1 |
| 4,811,408 | 3/1989 | Goldman ........................... 340/825.34 |
| 4,820,912 | 4/1989 | Samyn ............................... 340/825.34 |
| 4,975,969 | 12/1990 | Tal ....................................... 382/2 |
| 5,027,113 | 6/1991 | Bonnaval-Lamothe et al. .......... 382/2 |
| 5,071,168 | 12/1991 | Shamos ............................. 340/825.34 |
| 5,159,646 | 10/1992 | Kumagai ............................... 382/1 |
| 5,222,152 | 6/1993 | Fishbine et al. ........................ 382/2 |

*Primary Examiner*—Joseph Mancuso
*Assistant Examiner*—Gerard Del Rosso
*Attorney, Agent, or Firm*—Thomas M. Freiburger

[57] ABSTRACT

A method and system for determining the authenticity of an item such as an original work of art, an art print, valuable jewelry or other valuable items utilizes images of one or more unique patterns of features, preferably at a microscopic level, as one or more "signatures" of the item. The image of this unique signature is recorded and stored electronically as data representing the unique pattern. The data are registered with identifying text and stored in a secure storage location, to prevent unauthorized duplication or use of the stored data. Following this registration and storage, an item presented as authentic can be examined microscopically at prescribed sites on the item where the original images were taken. Comparison is made at one or more of the sites, and a decision is made as to whether the item exhibits substantially identical features to those originally registered, so as to be the same authentic item. Comparison can be made electronically or visually/microscopically. The storage location can be a central location-remote from local verification stations, with data transferred to and from local stations by telephone lines or other communication links.

11 Claims, 7 Drawing Sheets

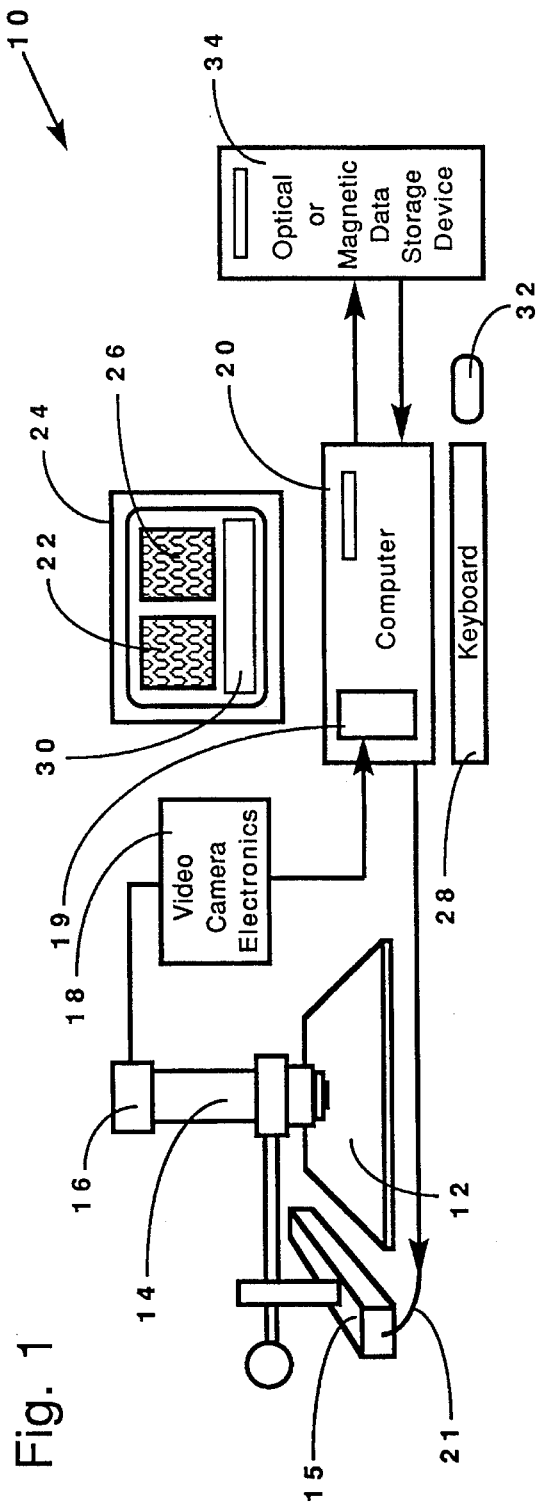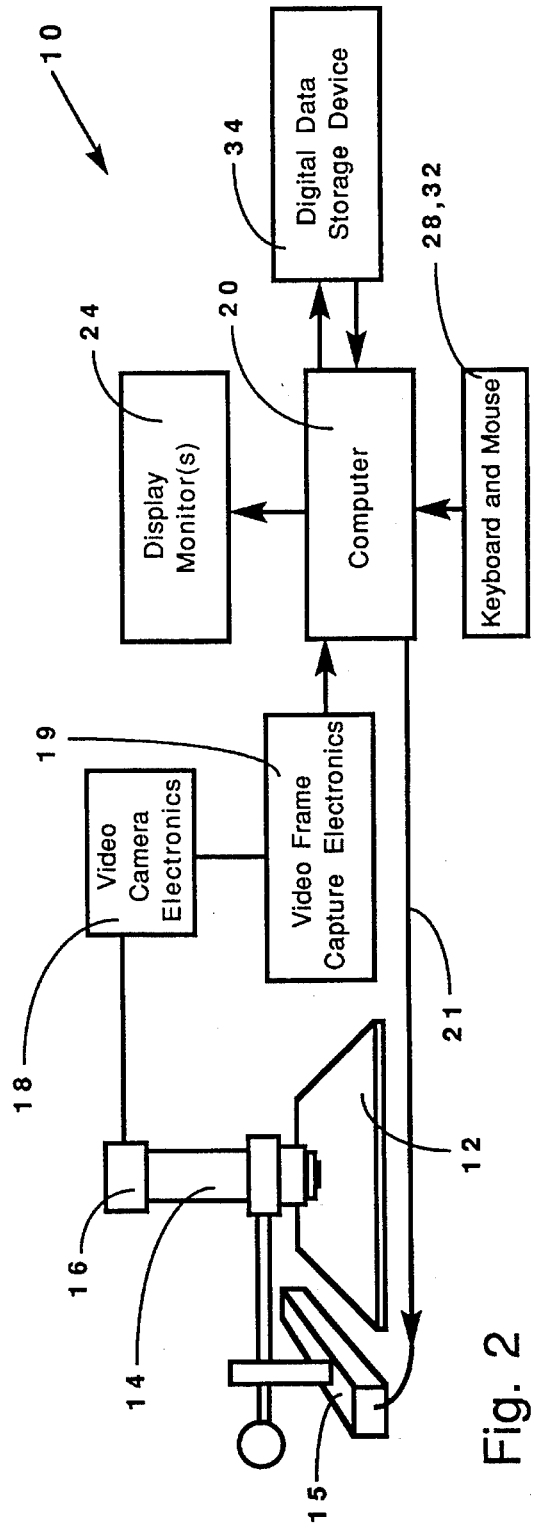

SYSTEM FOR REGISTRATION, IDENTIFICATION AND VERIFICATION OF ITEMS UTILIZING UNIQUE INTRINSIC FEATURES

BACKGROUND OF THE INVENTION

The invention relates to verification of unique items, usually items of value, and more specifically to a system for registration of unique features of an item, preferably intrinsic features, and storage of data relating to the unique features for later retrieval and comparison with similarly located features of an item purporting to be the authentic article.

A number of different systems and processes have been known for registering items, documents or living beings by unique features found on the items or added to the items, for later comparison to determine whether an item purporting to be the original is indeed the original. Fingerprints, for example, have been used for many years as unique characteristics of each person, to be registered and later compared to a person or an impression left by the hand of an unknown individual to determine identity. Other methods of identifying persons based on the same general principle have involved voice pattern identification, DNA testing and various other unique physical characteristics of human beings.

Pattern recognition has been used in the past to identify objects, particularly documents. The general approach has been to place something having unique physical characteristics onto a document or other object, to examine the pattern-containing addition for a unique pattern or to knowingly place data or information by a method such as a microdot, and to keep a record of that unique pattern or information, for future authentication of the article.

The following patents have some pertinence to the system of the present invention, as regards authentication of documents or living beings: Bonnaval-Lamothe U.S. Pat. No. 5,027,113, Taylor U.S. Pat. No. 4,414,546, Goldman U.S. Pat. No. 4,811,408, Rice U.S. Pat. No. 4,699,149, Goldman U.S. Pat. No. 4,423,415, Roth U.S. Pat. No. 3,778,781, Knop U.S. Pat. No. 4,661,983, Shamos U.S. Pat. No. 5,071,168, Tal U.S. Pat. No. 4,975,969.

The Bonnaval-Lamothe patent is directed toward printed information, i.e. documents. The technique of authentication employed by Bonnaval-Lamothe involves the concept of a theoretically perfect alphabet letter, as an example, as a means for identifying a document via minute details. The disclosed system, while recognizing that each printed letter on a document has unique characteristics on a microscopic basis, due to the differences in the ink's distribution on the texture on the paper, records only "unique deviations" between the shape of a printed alphabet letter, in microscopic detail, from a theoretically perfect version of that letter. These "unique deviations" are recorded and used as a basis for comparison in a document authentication procedure at a later date. In the authentication procedure, the deviations of the alphabet letter are compared to the previously stored unique deviations in an effort to determine whether the document being authenticated is indeed the same document. The disclosed system does not involve recording and direct comparison of actual patterns of alphabet letters or other minute intrinsic features contained in documents, works of art or other articles; it looks at deviations from a theoretical norm. Further, by concentrating on a theoretically perfect alphabet letter, the system of the patent teaches a system which is generally applicable only to printed characters or other regular, known shapes in documents; in this sense the disclosed system does not contemplate the examination, recording and verification of intrinsic microscopic features in works of art where such regular, theoretically perfect shapes are not present. This underscores the important difference that the Bonnaval-Lamothe patent emphasizes the examination and processing of data, data regarding deviation from a supposed norm, not the investigation of an image.

Shamos U.S. Pat. No. 5,071,168 is specifically tailored to medical specimens, using fingerprint identification. The disclosed system, designed specifically for hospital use, simply comprises a means to identify patients during hospitalization. The patient's fingerprint is digitized and encoded on labels and specimen identification tags along with a bar code. Nothing in the patent indicates any attempt to identify or verify art objects or other inanimate objects.

The Tal patent also discloses a method for uniquely identifying human beings, in this case by facial feature analysis. The face is scanned as to key parameters, and these parameters are coded and stored, but the facial image itself is not stored. Verification of identity is accomplished by repeating the process and comparing the derived data with the stored reference data.

Goldman U.S. Pat. No. 4,811,168 describes an identification card system for individuals. A facial photograph on the card is digitized and processed, then encoded onto the card itself. The data printed onto the card carries information regarding what should be detected in an examination of the I.D. card photo. In other words, the Goldman system simply comprises image verification for a photograph of a human face, to authenticate the identification card. Goldman does not disclose reviewing in microscopic detail a portion of the I.D. card or of the photograph, and later making a comparison of actual images to determine whether a purportedly valid I.D. card is the authentic card.

Goldman U.S. Pat. No. 4,423,415 relates to an added on authenticator tag which is attached to an article. The means of authentication is by detecting a "fingerprint"-like pattern in the pattern of translucency of the paper authenticator tag. The patent has little relevance to the present invention, either in theory or in applications.

The Knop patent discloses a method for confirming genuineness of a document by comparing preregistered microdata to verification micro-data taken at the same place on the document. Although the system utilizes microscopic examination of a sample and creation of a reference record, it uses a very specific inorganic dielectric coating, which inherently has a random crack pattern, for developing a unique recordable pattern for the document. Similar to other prior systems, Knop uses the addition of a signature-bearing device to the article to be authenticated, rather than exploiting a pattern or image intrinsic to the object.

The Rice and Taylor patents are concerned with identifying individuals by fingerprint-type preregistration and later correlation of gathered data against the preregistered data. Rice discloses an alternative to fingerprinting involving scanning and recording of patterns of subcutaneous blood vessels. The Taylor patent describes the use of "chestnuts" on the joints of horses, providing a uniquely recordable pattern which can later be used to verify the identity of the horse. This is similar to fingerprint registration of human beings.

Nothing in the patents described above contemplates a system similar to the present invention described below, wherein a valuable object, such as a painting, sculpture, stamp, gem, or document is registered for the purpose of subsequent identification, by microscopically examining said object and recording one or more images of said object's minute intrinsic features. The collection of the stored reference images, in concert with the remote imaged communications technology thus becoming the basis for a broad based system for secure verification of works of art and other valuable objects.

SUMMARY OF THE INVENTION

The method and system of the present invention, in a preferred embodiment is based on the premise that every object, regardless of its similarity to other objects or copies at the normal level of examination by the human eye, has unique intrinsic features at a microscopic level. Random or chaotic processes of nature at the atomic and/or molecular level ensure that any physical object is a completely unique arrangement of atoms and/or molecules. Physical objects may share nominally identical or similar constituent materials and macroscopic features such that they are rendered virtually identical to the human eye as well as to many common differentiation techniques. However, at some level of magnification, any physical object will reveal absolutely unique features intrinsic to itself. These features will be a direct result of random or chaotic processes of nature or may be the result of the creative process of man or a combination of both.

The process and system of the invention involves examination of a physical object at an appropriate level of magnification and, using appropriate techniques and procedures, detecting and recording one or more absolutely unique features or micro-features of that object at a microscopic level, and creating a reference recording of those micro features and of their location on the object. The reference recording is used in subsequent comparative examination procedures to authenticate an object at a later time, i.e. to verify the object under examination is or is not the same object which was originally recorded.

Although the system of the invention is applicable to nearly any inanimate object, one primary area of its applicability is to provide the fine art community with a secure and robust method to accurately determine and record the intrinsic microscopic signature of any valuable work of fine art and to use that recorded signature subsequently to confirm the identity of the item by comparison with the recorded, registered data. The system of the invention offers the fine art and insurance industries a significant breakthrough in the never-ending campaign against fraud, theft and other mechanisms of loss. The fundamental principle forming the basis of the process if somewhat analogous to the fingerprinting process used in criminology and human identification, although the present process goes further. As stated above, the principle is that at a microscopic level, even virtually identical objects or art prints made from the same plate contain unique microscopic anomalies created by random physical and statistical effects occurring at the time of manufacture or printing, giving each object a unique microscopic "fingerprint" or "signature" that is virtually or wholly impossible to reproduce.

The registration and verification system of the invention microscopically detects, catalogs and retains images of these minute anomalies or micro-features, as permanent reference records for use in subsequent identification and verification procedures.

The techniques of the invention cannot certify that a particular painting or other artwork was or was not created by a particular artist. What the system does is to confirm that a painting or other work is or is not the very same article which has earlier been examined and registered through the system. This verification can be performed with a very high degree of confidence, virtually 100%. The service can be performed at many locations worldwide, relatively inexpensively, regardless of whether the art object is brought back to the same location where it was originally imaged and registered. Thus, for example, museums, collectors and insurers are greatly benefitted by the ability to preregister a traveling art exhibition, then to periodically examine the exhibited works throughout the tour of the exhibit. Museums, galleries and large private collectors will be benefitted by registering their entire collections over a period of many years.

Accordingly, the system of the invention comprises a significant contribution to enhancing customer confidence in fine art purchases and in significantly reducing the risk of loss due to fraudulent substitution in traveling collections.

In a preferred implementation of the process of the invention, optical microscopy is used in combination with commercial high resolution video imaging, computer and networking technology, magnetic and optical data storage techniques and high security techniques.

In one implementation of the invention, the preferred method for determining the identity of an item, as to whether the item is a particular unique item previously known, comprises first detecting and recording a unique pattern of features at a selected site of the item, preferably at a microscopic level. Data relating to the unique pattern of features are stored electronically, and steps are taken to assure the security of the stored data against unauthorized duplication or use of the data. At a time subsequent to the storing of the data, a subject item purporting to be the particular unique item is examined, at a site on the item corresponding in location to the selected site used for registration of the authentic object originally. A comparison is then made between data currently derived and data prerecorded, to determine whether a pattern of features exists on the subject item which is substantially identical to the unique pattern of features initially recorded, so that a determination is made whether the item is the same unique item.

In one preferred embodiment the original detection and recording of the unique pattern is accomplished by taking a video microscopic image of the micro-features. The video microscope provides a live, moving image which can be monitored, and the operator can select a frame to be used for the registration. The live video information is digitized and fed to a computer for display on the monitor, and the operator simply selects the appropriate frame or frames which are to be used for recording and registration. Text information is entered via a keyboard, to be stored along with the selected frames for registration. From the computer, image storage can be effected locally, such as on optical or magnetic data storage, for local use in verification of works at later dates, such as for the large collection of a museum.

However, in a more broad based system of the invention, the locally gathered imaging data are sent via modem or other communication link to a central recording/registration location elsewhere in the world, where all registration data, images and associated text, are securely retained for later verification use.

By the process of the invention, for recording and registration of an intrinsic "signature", some distinctive mark or characteristic of an item is located, that characteristic being an essential or fundamental part of the item, and that feature is used as a basis to later confirm the identity of the item. The selection of features is limited to features which are non-dynamic, remaining constant with time. Any object reviewed at an appropriately high level of magnification will reveal a randomness of pattern, resulting from the processes which created that object, with a wealth of micro-features which when recorded will create a natural record at least as unique to that item as a fingerprint to a human individual.

As one example of the process, it can be used to record, catalog and subsequently identify a fine art lithograph. The first step in the process is to examine the finished work using optical microscopy techniques at some controlled point in the work's history. Generally this can be the work as produced in the artist's shop, even though the time of recording can be later if desired.

When the artist decides the lithograph is complete, the work is microscopically examined, which can be at the artist's studio, by a cataloging expert familiar with the system of the invention, using a special image recording system. The local recording terminal uses a secure modem operating over the common telephone system (or another communication link) to remain in constant contact with a master computer at a system headquarters location, throughout the registration process. The operator proceeds to microscopically explore the artwork's micro-features. Using high resolution video imaging equipment, the operator will discover and record many sets of unique microscopic features of the artwork itself. The high resolution video images of those features and the location of their sites, at specific locations on the surface of the artwork, form the core of the data record to be registered. These images of micro-features will become the intrinsic features used for subsequent identification/verification.

Examples of micro-features which can be found in a lithograph include small irregularities in the application of ink, tiny microscopic bubbles trapped in the ink medium, unique spatial relationship between features of the applied inks and the fibers of the paper itself. The physical location of the micro-features on the artwork, i.e. the location of the examination point, is referred to as a "reference site" or "microsite", referring to a site which has been magnified. At least one and usually more reference sites are microscopically examined and recorded for any single work. The locations of these sites are then stored in a video image reference site index map of the work. This site index map and the stored microscopic reference images are then combined and encrypted by computer software algorithms, with various text information including the name of the work and the artist, a serial number or series number if the work is part of a series or limited edition, and other relevant information. This combination now comprises the registration record for the work.

In an optional step which can be employed in appropriate circumstances, such as for relatively inexpensive items or documents, a registration mark can be added to the work for recording and registration. This can be a small (e.g. 1.0 mm to 1 cm) stamped logo or design added adjacent to the artist's signature or the series number, for example, and appearing as a small dot or symbol to the ordinary observer, positioned in such a way as not to interfere with the aesthetic value of the art work. This gives a regular mark and a regular location for registration and verification, and can indicate the fact of registration in the system simply by a naked-eye check. The recording and verification process, as with using other micro-features, is accomplished via anomalies or irregularities in the application of ink on the paper or other medium. Thus, counterfeiting of the micro-dot stamp itself will not defeat the verification system.

The registration record is immediately encrypted and electronically transmitted to the reference data base master computer at system headquarters for storage, over telephone lines or other communication link. The main reference data base computer receives and temporarily stores the registration record of the artwork. Upon proper verification and visual confirmation by both the remote station (e.g. at the artist's studio) and the master recording operator at system headquarters, the master computer recording operators then conclude the artwork record is valid and accurate. The record is then included in the on-line catalog of the system. Eventually the record can be electronically duplicated and transmitted to multiple data storage locations for use during subsequent identification or verification procedures. A hard copy (printed) record of the registration procedure indicating that the work has been cataloged within the main system data base is simultaneously produced by the local recording instrument and will accompany the other conventional certification documentation for the owner. The actual art object may optionally be indelibly marked with a microscopic logo representing the system, to indicate that the work has been registered using the system. The system of the invention allows for high level secure encryption of both the microfeature images and accompanying reference data for added security against potential tampering or alteration. Also, multiple reference data bases make it increasingly difficult for anyone to corrupt the system. Additional proprietary security procedures can be included to enhance the security of the more expensive work.

At any time subsequent to the registration procedure, an artwork or other item may be examined for verification at any authorized system terminal. The verification procedure is carried out in the presence of, for example, a buyer and a seller of an artwork purporting to be a particular registered artwork. Although the equipment for validation shares similar capabilities with the recording equipment, validation equipment cannot record or alter registered reference data. It simply acts as a remote terminal to the master system data base and can be operated by any system authorized and trained individual.

The validation procedure entails placing the work on an appropriate examination surface and positioning the high resolution video microscope probe over a reference site or microsite for the artwork, and comparing the actual artwork to one of its reference images stored within the system master data base. To accomplish this comparison, the operator logs his local verification terminal onto a verification network of the system by common local, long distance or international telephone lines or by other communication links which may be dedicated links, if desired. Once the dealer has logged onto the system network, a system catalog number for the item in question should be entered. When the catalog number of the work is verified, the system master data base electronically transfers the currently registered referenced image or images set for that work to the validation station, i.e. the local terminal.

Next, the reference image or images are compared with a local real-time video image of the actual work, at the same level of magnification, for correlation. Most works will require only a simple visual comparison at the level of magnification involved, for each reference site. The system, through the local terminal, can make available a printed copy of the live and reference images, as a record of the validation procedure. More expensive works can additionally utilize a fully interactive image auto correlation using the main system computer, at the system headquarters. This auto correlation procedure is fully automated and performed in real time. If this auto correlation step is selected, the results of the correlation as well as the hard copy of the initial visual comparison, is output from the local system printer as a paper record of the validation procedure.

The validation process may also include another step if requested and arranged in advance by a prospective buyer. When the work was originally recorded and registered in the system, ordinarily many reference sites were recorded. Records for these sites have been combined into discrete sets of reference images. Normally, only the first set of images is used for subsequent verification. At the request of the buyer, a virgin set of reference images, i.e. a set not previously used, may be requested for a high level verification procedure, giving additional security against tampering. If the work passes correlation using its first set of images, the high level verification procedure will cause the master system data base computer to provide a new set of reference images and site coordinates to the local verification terminal, and the process will be repeated with these virgin data using different sites from the first correlation proceeding. This option will frustrate the unlikely event that a copy of the reference images could somehow have been obtained previously, with a covert attempt underway to use such copies to deceive the prospective buyer and the remote operator. These new reference images will never have been published or previously utilized for any verification. Once used, the new set of images can become the standard set for subsequent verifications. The process may be repeated until the number of unused verification data sets is down to two. At that time the work should be rerecorded and registered to again provide a larger number of virgin data sets.

Although the system of the invention as discussed above is particularly applicable to works of graphic art, it is also applicable to other objects which are subject to counterfeiting and copying. Such other objects can include valuable items such as rare coins, stamps, gems and jewelry as well as other art objects such as sculpture, and a broad range of security dependent documents, sensitive parts and items in a variety of scientific, research and defense areas.

DESCRIPTION OF THE DRAWINGS

FIG. 1 is a partially schematic view showing components of a basic configuration of a system in accordance with the invention, with some items indicated in block diagram form.

FIG. 2 is a schematic block diagram which shows the system of FIG. 1, in more schematic, functional format.

FIGS. 5, 5A, 5B and 5C are schematic views showing an image and a series of higher level enlargements, illustrating a principle of the verification system of the invention.

FIGS. 6, 6A, 6B, 6C, 6D, 6E, 6F, 6G, 6H and 6I comprise a series of views somewhat similar to FIGS. 5–5C but showing verification steps using different levels of magnification of a selected reference site on a work of art, in accordance with the invention.

DESCRIPTION OF PREFERRED EMBODIMENTS

Figure 2A:
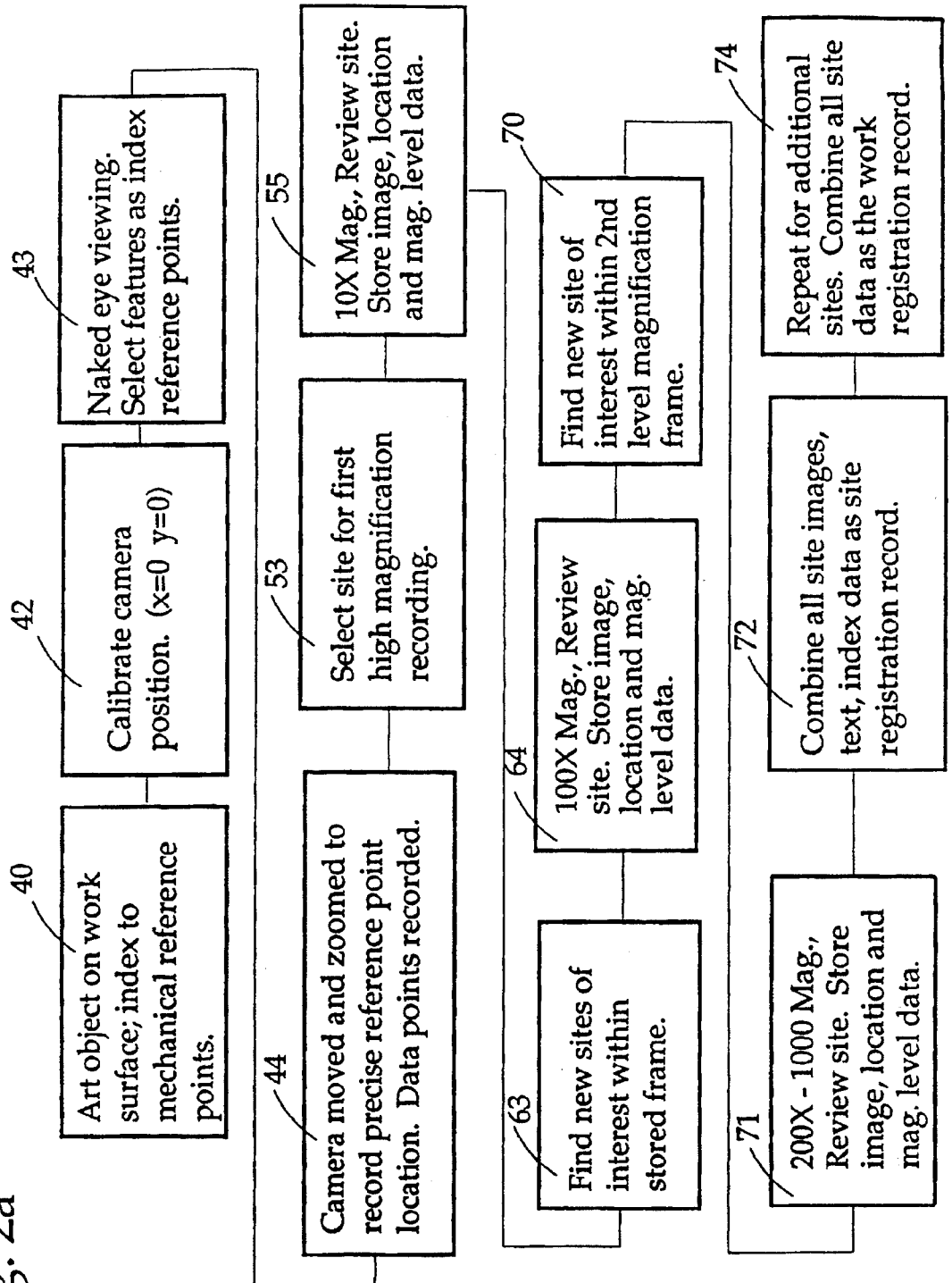
FIG. 2A is a process flow chart indicating steps in locating and imaging recording sites on an article being registered.

In the drawings, FIG. 1 shows, in a primarily schematic format, a locally based system in accordance with one embodiment the invention, generally identified by the reference number 10. The locally based system of FIG. 1 illustrates some of the features of the invention; it can be a stand alone system, or it can essentially comprise a part of a network type system shown in FIG. 3, to be described below. The system 10 enables objects to be viewed microscopically, to have minute "signatures" or aberrations at microsites of the objects imaged and recorded along with data and text for registration in the system; and it enables an object later to be examined microscopically, at sites corresponding to the "signatures", for authentication as to whether the purportedly genuine item is in fact the genuine item which has been registered.

Figure 3:
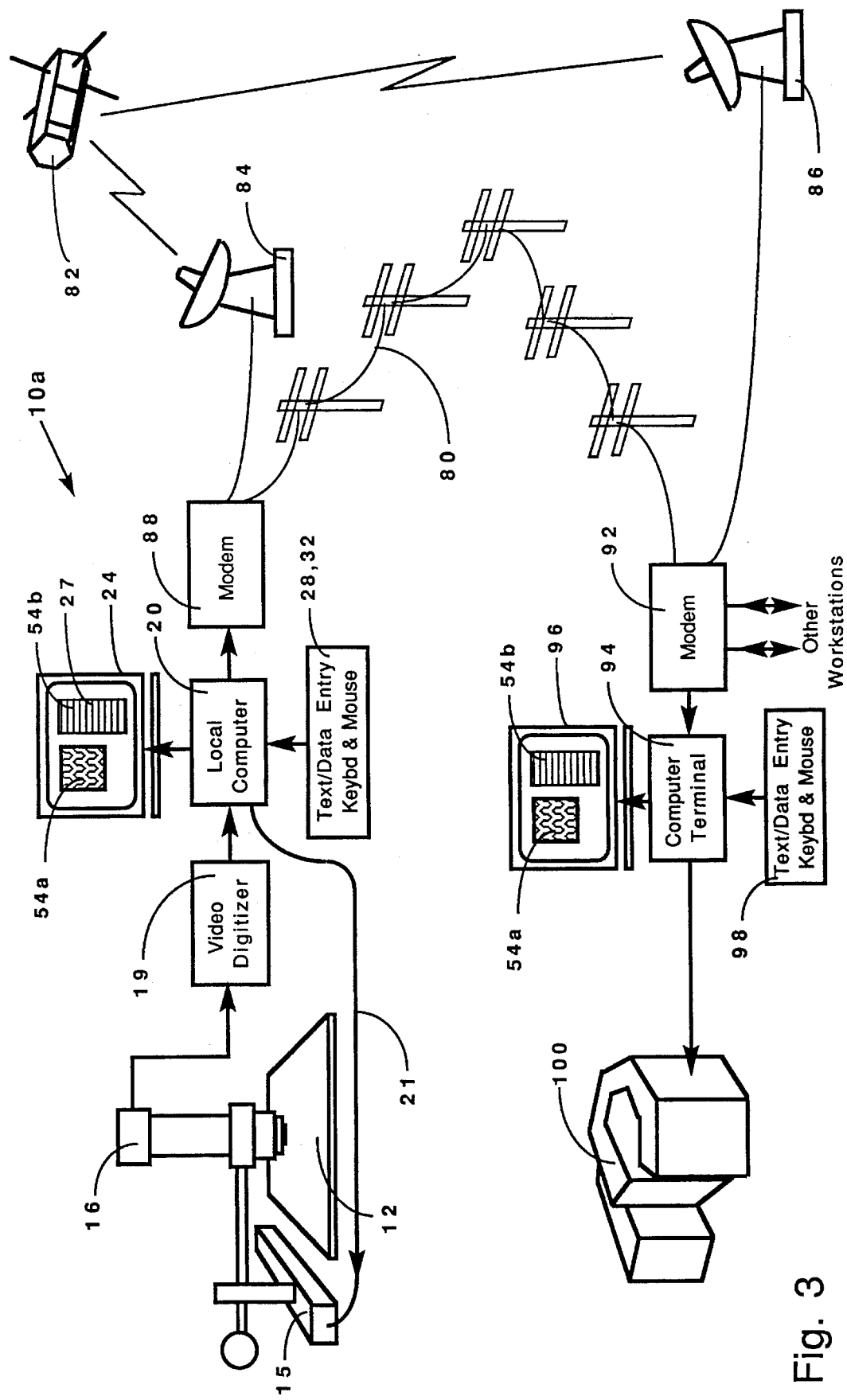
FIG. 3 is a schematic diagram, with some components indicated as blocks, showing a broad based system having a main or central location where registration data are stored, with communication links to remote local terminals.

As shown in FIG. 1, an important object of value 12, which may be an art object, is scanned by manipulation of a video microscope 14, secured on positioning equipment indicated symbolically at 15. The video microscope incorporates an IPD (image pickup device) 16, passing a signal in real time through an attached video camera body 18 having a video frame digitizer to a computer 20. The computer receives a stream of real-time video image input in the form of sequential frames, and includes a frame capture board 19. The user scans the video microscope 14 over the surface of the object 12 using the computer 20, sending signals over a control line 21 to the positioning device 15. Viewing of the object 12 is done preferably at a series of successively greater magnifications as further discussed below, with the user viewing the scanning image in real time, as indicated at the left-side image 22 on a video monitor 24 in FIG. 1. (FIG. 1 also indicates a right-side image 26 on the video monitor, but this is for instances wherein comparisons are being made, as explained below.) FIG. 3 shows a single image 22 on the left side of the monitor 24, with entered text information 27 to the right, a configuration which can be used for registration of the art object 12.

Also connected to the computer is a keyboard 28, for enabling a user to make text entries which will accompany the images selected for recording/registration. Such text can be viewable in a display area 30 of the monitor or more preferably in the text area 27 shown in FIG. 3. A mouse 32 can be advantageously connected to the computer, for manipulating a cursor or other screen element so as to enable selection of areas for magnification, and also for manipulation of the position and magnification of the video microscope 14. A joystick or rolling ball type positioning input element could be used in lieu of the mouse 32.

As indicated in FIG. 1, the computer is connected to electronically store data (images and text) in a storage device 34, which can have optical or magnetic data storage (both referred to herein as electronic data storage). When the operator has selected one or more micro-features of the art object 12, as determined by an initial naked-eye review and then viewing of the live video image 22 on the video monitor, the operator stops the video microscope at the selected site and types in the prescribed text information (if this has not already been done) including the micro-feature site description and/or coordinates of its location. The operator then commits the image and associated text/data information to storage 34, using the keyboard 28 and/or mouse 32.

FIG. 2 shows this simplified embodiment of the invention in more schematic format, as a block diagram and showing information and control flow.

Figure 5:
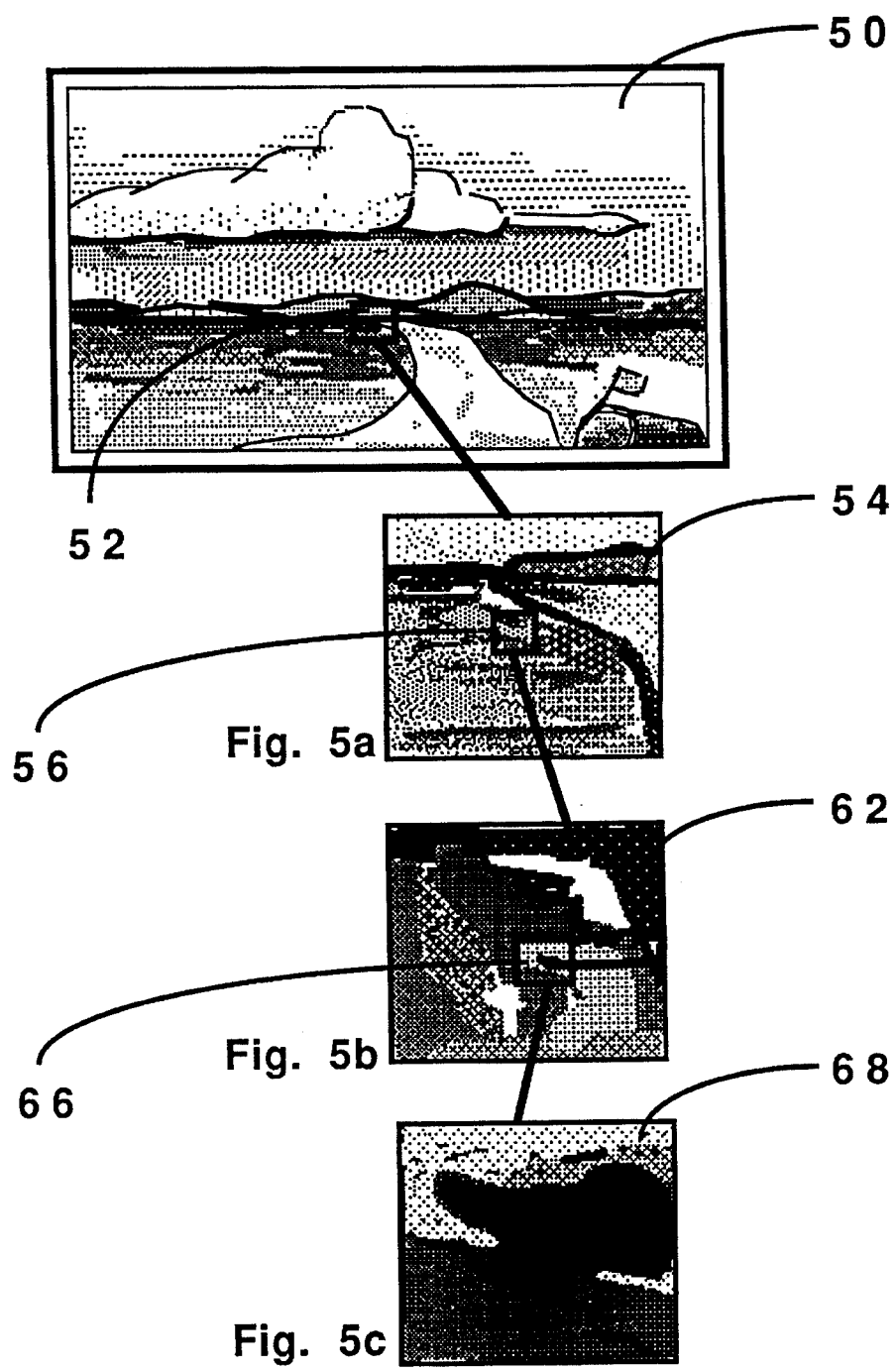

FIG. 2A is a simplified flow chart showing manipulative steps in selection and storage of micro-feature sites on the item to be registered. FIG. 2A should be viewed in connection with FIGS. 5–5C, showing an example of site location, successive magnification and further site location to arrive at "signatures" or micro-features to be recorded.

The positioning of the art object or other object on the table or work surface of the positioning device 15, in proper location for the video microscope, is indicated in the block 40. The art object is carefully indexed as clearly as possible to the machine's mechanical reference points, which constitutes low precision positioning. The position of the camera 14 is calibrated, so that nominal X and Y positions of the camera can be noted and viewed on the computer, as denoted in the second block 42. The camera may be moved to a home position of X=0, Y=0, for this purpose.

As noted in the block 43, the operator first reviews the object without magnification, to select macroscopic features, typically three, to use as precision reference points, for the camera-to-object high precision position survey. The reference points selected should comprise easily found landmarks on the art object and which can be described, such as the top of a nose or edge of a mouth, tip of a right index finger, end of a road, etc. The next block 44 indicates movement and zooming of the camera (preferably via the mouse 32 in FIG. 1) while the operator observes the live video signal. Systematically, each previously identified macroscopic reference point feature is located and its image is centered on the central crosshairs of the video image field. When adequate alignment is achieved, as observed by the operator, the video frame is captured and stored along with the camera X and Y position coordinates for that reference point. When all previously selected macroscopic features or reference points have been likewise surveyed and recorded, a set of precision reference points which refer only to readily recognizable and describable macroscopic features of the object itself, now exist and are stored as reference data for the procedure. These index data are combined with index text data, entered by the operator and stored as an index record for the art object registration.

The process goes forward utilizing these surveyed precision index reference points to determine all subsequent camera position coordinates, for "signature" locations as selected, relative only to the object itself. Thus, if the art object is later framed or is examined with edges which are somewhat different from those existing when the object was registered originally, the landmarks of the index or reference points allow calibration of the equipment to correct for any such change in position of the object relative to the positioning device 15, regarding either translation or rotation of the object.

These precision index points having been determined and recorded, the registration process may proceed to the high magnification portion of the process.

The high magnification recording steps can be better understood with reference to FIGS. 5–5C. FIG. 5 shows an artwork 50 comprising, as an example, a rural scene. This can be an original artwork or a limited edition, numbered print, for example. FIGS. 5–5C shows a progression wherein the operator selects a signature point or area 52 after the precision reference point recording described above. The area 52 can be selected by naked-eye perusal or by viewing at a low level of magnification. This is indicated in the block 53 of FIG. 2A.

The recording camera is then increased to the first level of magnification, typically 10×. This is shown at 54 in FIG. 5A, an enlarged view of the selected site area 52. The enlarged site is reviewed by the operator, and if satisfactory, is stored along with its location coordinates and magnification level as indicated at 55 in FIG. 2A. The camera crosshairs are centered on the frame 54 for storage of the frame, and the X and Y coordinates, automatically known from the equipment, are stored. These data are recorded as registration site No. 1, frame No. 1, magnification level No. 1.

Next, the operator selects a site within the enlarged frame 54, as indicated in the block 63 in FIG. 2A, either by reviewing the 10× frame 54 or by scanning at the next level of magnification. In either event, the newly selected site 56 is reviewed at the higher magnification level as the frame 62 in FIG. 5B, and the process of recording is repeated. The frame 62 is captured and the video image is stored along with the corresponding X and Y camera position coordinates and the magnification level, as registration site No. 1, frame No. 2, magnification level No. 2. This is indicated in the block 64 in FIG. 2A.

The next step is to select a new feature 66 within the frame 62 shown in FIG. 5B. Again, this new site may be selected under the second level of magnification, or the operator can first go to the third level of magnification and scan the frame 62 to locate the area of interest 66. The third level magnification, showing this area of interest 66, is shown at 68 in FIG. 5C, and the selection step is indicated at 70 in the block diagram of FIG. 2A. The operator will review this third-level image 68 before recording. This highest level of magnification may be about 200× to 1000× typically. The selected final image 68, as noted in the block 71 in FIG. 2A, is captured and stored along with the corresponding X and Y camera position coordinates, as registration site No. 1, frame No. 3, magnification level No. 3. This step completes the recording procedure for site No. 1.

Next, all data taken and temporarily stored during the preceding steps at site No. 1 are combined and encrypted for transmission and storage, as noted in the block 72 in FIG. 2A. This record of text and image information comprises the registration record for site No. 1.

The process will now typically be repeated for additional sites on the art object. When all high-magnification sites have been similarly recorded, the collection of site registration records along with a master index record as described above relative to reference point locations is further encrypted and stored as the full art work registration record. These steps are indicated in the blocks 72 and 74 of FIG. 2A.

The enlarged image 68 of FIG. 5C indicates an example of micro-features which might be seen at the final magnification level, and which will have unique, non-repeatable and distinguishing features beyond those of previous levels of magnification. As can be seen from the example of successive magnification shown in FIGS. 5–5C, at each further magnification level, more unique features are brought out. At the unmagnified levels as shown in the full-frame image 50 of FIG. 5, the naked eye would probably not discern any differences from one limited edition print to another. At the first level of magnification as in the frame 54 in FIG. 5A, certain anomalies between different prints of the same image might begin to appear. At the second level of magnification as shown in the frame 62 in FIG. 5B, which might be 100×, unique intrinsic signatures begin to emerge. At the final level of magnification 68 in FIG. 5C, which can be, for example, 1000×, each sister print might have an entirely different appearance from the others, and the differences might be so strong that no patterns will be recognized as common. This depends, of course, on the level of magnification, the paper and ink stock, the type of printing plate or printing process used, and other factors.

FIG. 3 shows schematically the registration of an item such as an art object in a system similar to that of FIGS. 1 and 2 but comprising a network, with a central location distant from the local system 10*a* and connected by telephone lines 80, satellite 82, with uplink/downlink ground facilities 84, 86, or other communication links. The local registration component or subsystem 10*a* is the same as described relative to FIGS. 1 and 2, except that instead of registration images and data being stored locally, at a data storage device 34 and in FIGS. 1 and 2, the information is sent over modem or other communication link 88, and the communication links as described, to a central or headquarters 90 for all registration and verification activity. Data are received and transmitted via a modem or other communication link 92 at the central station 90.

Similar to the local workstations 10*a*, the central system location 90 has a computer terminal 94, connected to a monitor 96 and a text/data entry keyboard and mouse 98. The computer terminal 94 communicates with a central computer 100 for the system, i.e. the network comprising the central location 90 and a series of remote local workstations such as the station 10*a*.

When a work is to be registered under the system of the invention, the steps at the local workstation 10*a* are as described above. However, during the registration process, the local station 10*a* preferably is on line with the central registration station 90, with an operator at the central location monitoring all steps of the procedure. In the registration procedure, the local operator and the central operator work in concert with each other, primarily for security. Active participation together is required during the registration only. During verification, as described further below, the local operator can perform all of the correlation steps, while on line with the central computer. Generally, as also discussed below, a machine correlation or auto correlation step is performed at or near the end of a correlation procedure, as a final verification. This machine correlation is performed only via the central computer and the central operator, where the algorithm for auto correlation is located.

Thus, all item registration records generated at the local registration terminals or workstations such as the terminal 10*a* are collected and securely stored in the central computer 100 for the system. Steps are taken to prevent unauthorized viewing, copying or use of the stored registration records.

When an art object or other item is brought to a local terminal 10*a* to be verified as to its authenticity, the local operator places the art object 12*a* on the positioning and locating machine 15, registering it mechanically as best possible (it may be difficult to locate the object closely, since the edges may have changed or the object may be cropped or framed, etc.). The camera position is calibrated, as before. Communication is made with the central registration location 90, by computer link via the modems 88, 92. The process is similar to a computer wide area network function or "bulletin board", wherein the message is queued in the order received, for processing by the central system. The central registration location 90 is alerted to the fact that a certain item 12*a*, which has been stated to have been previously registered with the system, is to be authenticated. The link is made for data transmission in both directions. In this case, it is preferred that the actual verification steps be carried out by the operator at the secure central location 90, to prevent any possibility of fraud at the local station 10*a*.

Once the link has been made, the operator at the central station 90 sends the registration record data for the art object previously registered to the local computer 20. The central operator is enabled to control the camera and positioning machine 15, via the communication link. The central operator can do this by using the keyboard or preferably a mouse or joystick 98 connected to the computer terminal 94. The software from the central computer 100 preferably governs the process, at least in this preferred embodiment, such that the local computer operator at the local terminal 10*a* cannot override the main operator in the verification process. Thus, the central computer operator at the central location 90 is able to manipulate the camera and positioning system 15 at the local terminal, so as first to locate the series of index points or reference points (preferably three) on the art object 12*a* which purports to be the genuine article. Since these are described in stored text and are easily recognizable features on the art object, the operator has no trouble in going to these index points, centering the crosshairs, and making an entry, such as by pushing a button on the mouse. This gives reference coordinates of the three index points, enabling the system to accurately locate all registration sites, using these index points as a correlation base. Even if the art object is in a considerably different from the position when it was first registered, even with some rotation, the calibration can be accomplished if these index points are accurately found and entered. The magnification level can be correlated, also, by the difference in coordinates and software-calculated distance between them. Once these index points have been properly entered and the system has been calibrated to the index points, the process of verification, as represented schematically in FIGS. 6–6I, can begin.

Figure 6:
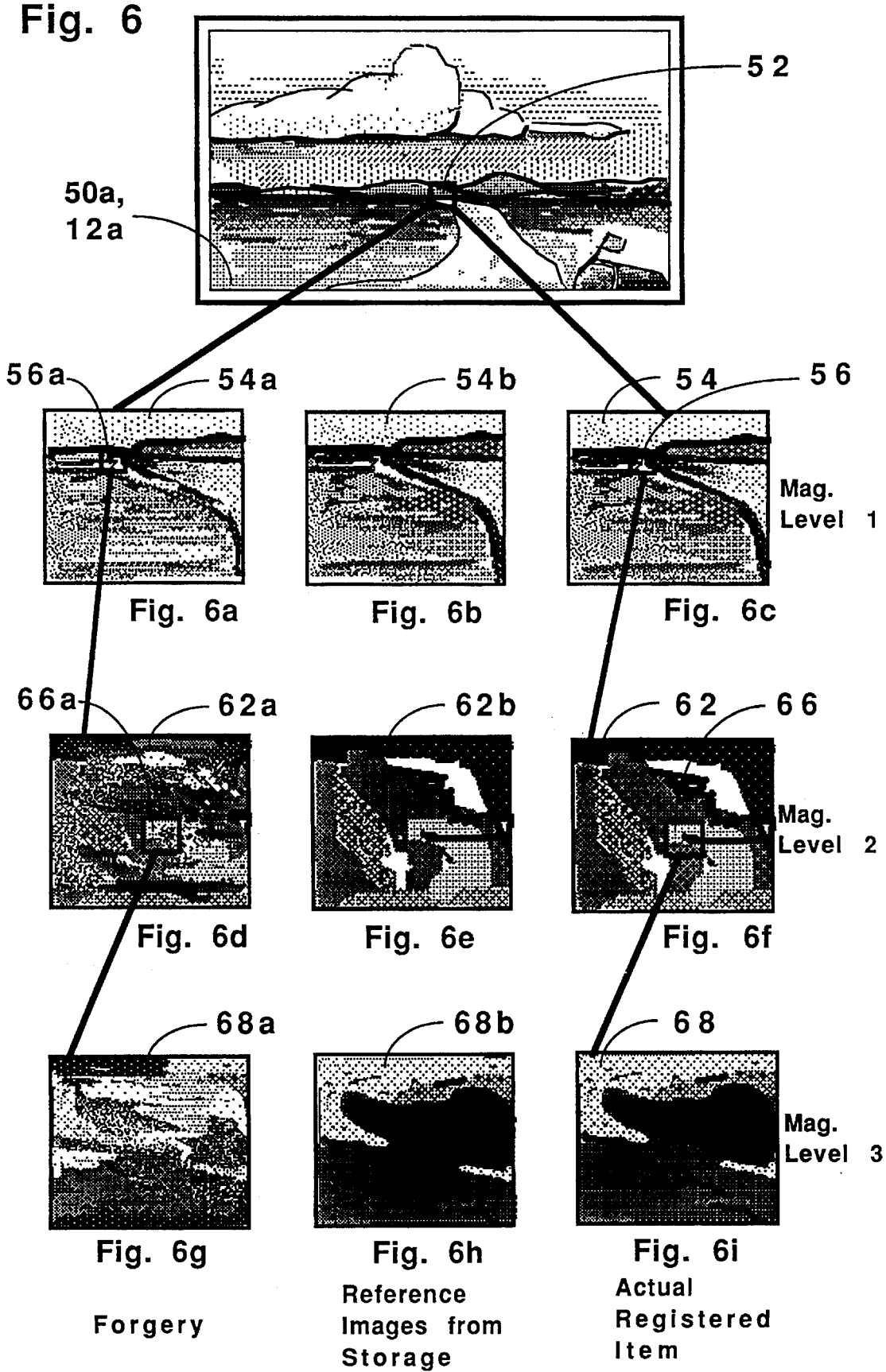

An art object as identified as 50*a*, 12*a* in FIG. 6 is placed at the positioning machine 15 for verification. Communication is made from the remote local terminal 10*a*, where the object is located, with the central system location 90 as noted above. The central operator, after locating the three index or reference points on the object 50*a* as described above, moves the camera to site No. 1, the site 52 as shown in FIG. 6. If desired for security, the local operator can be blind to these site locations and even to the three reference points for the object, provided this information was originally stored only at the central computer 100.

Once the first site 52 is located, enlargement to the first level of magnification is performed, producing the enlarged image 54*a*, shown on the left in FIG. 6A. FIGS. 6–6I shows a series of three columns of successively magnified images, the left column (FIGS. 6A, 6D and 6G) being for an item 50*a* which turns out to be a forgery or a different print of a limited edition, or for some reason not the actual registered item. The central column (FIGS. 6B, 6E and 6H) of images represents reference images recalled from storage, i.e. from the file of the art work registration record. The column on the right (FIGS. 6C, 6F and 6I) represents how the series of enlarged images would appear from the actual item which was registered earlier, that is these are the same images shown in FIGS. 5–5C for the actual registered 50.

Figure 4:
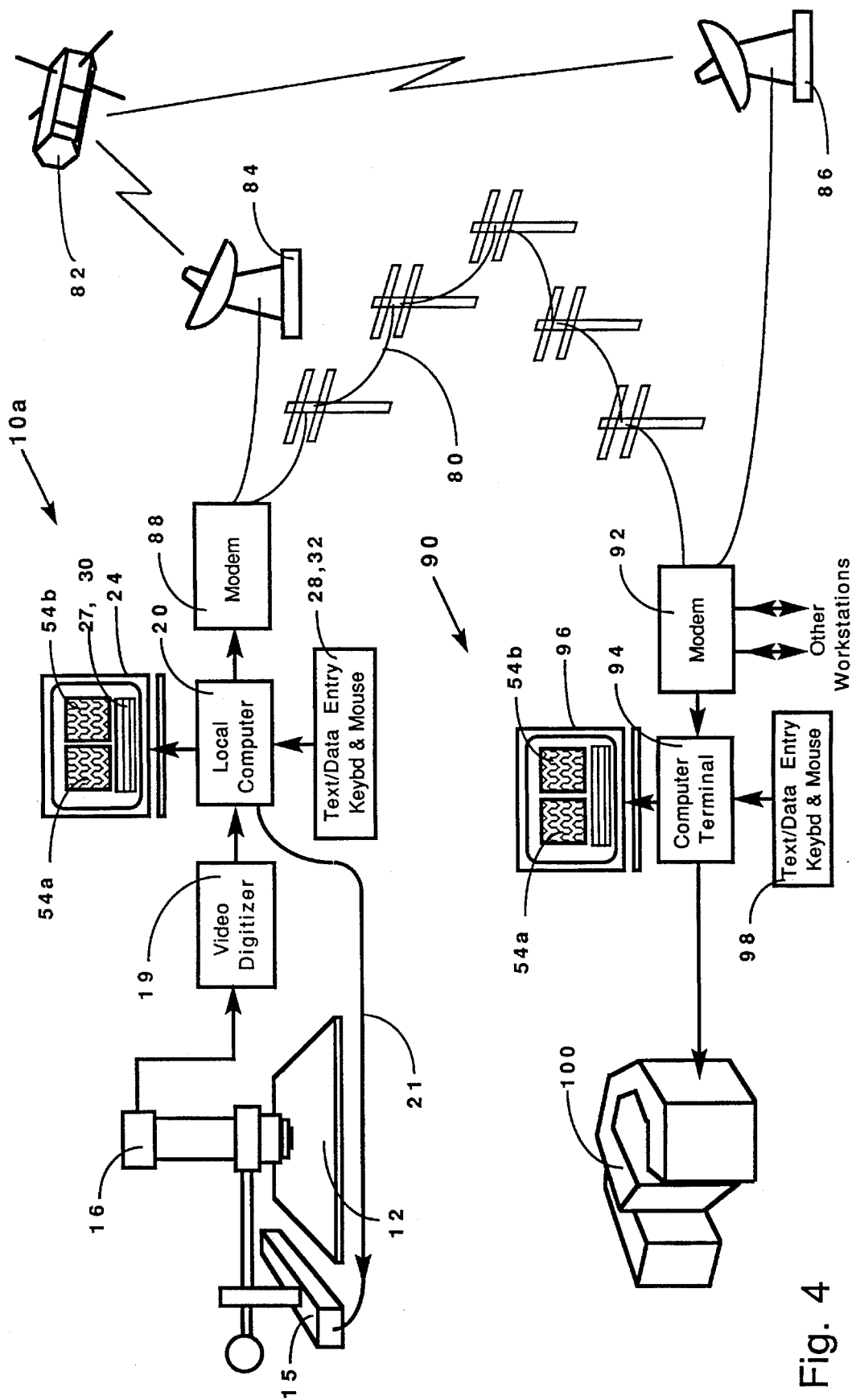
FIG. 4 is a schematic diagram similar to FIG. 3, but indicating verification steps using the system of the invention.

The first level magnification image 54*a* is compared with the reference image 54*b*, and it is these images 54*a* and 54*b* which will appear as the first set of comparison images on the central computer monitor 56 and also on the local computer monitor 24, as shown in FIG. 4. Images as they would appear from the genuine item as originally registered, which item is not necessarily present during the verification process, are identified by the same reference characters as used in FIGS. 5–5C.

Figure 7:
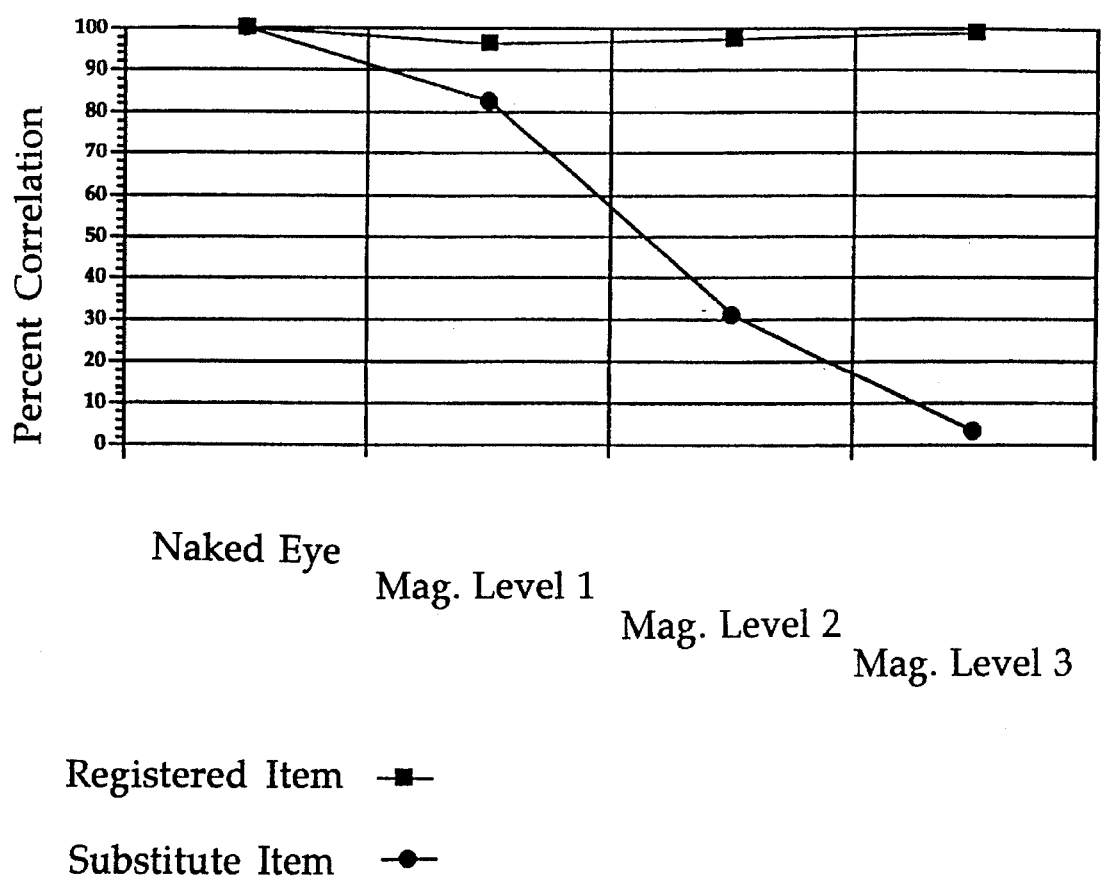
FIG. 7 is a graphic representation showing an example of percentages of correlation which might occur between stored images of a registered item and a fraudulent copy, at different levels of magnification.

In the verification process, the central operator compares the recorded site images at each level of magnification. Thus, as shown in FIGS. 6A and 6B, signature point or site No. 1, magnification level No. 1, is brought onto the monitor screen as images 54a and 54b. The operator notes that with these images at mild magnification (e.g. 10×), there appears to be some divergence of the item under verification from the registered data. FIG. 7 shows an example of correlation percentages which might be observed at the three different levels of magnification, for 10×, 100× and 200×. As indicated in FIG. 7, the percent correlation at 10× might be, for example, about 82%, versus nearly 100% if the actual registered item 50 were present (and as indicated in the image 54 on the right side of FIG. 6C).

At the next level of magnification, i.e. signature point No. 1, magnification level No. 2 as depicted in FIG. 6D, images 62a of the presently tested item and 62b from registration storage are compared. Here, considerably more divergence is noted, although there may be some overall similarity or some pattern similarity within the image. The images shown in the drawing assume a second level magnification of 100×. The graph of FIG. 7 indicates a much stronger divergence at this level, showing approximately 32% correlation, versus nearly 100% for the actual, genuine item.

At the third and final level of magnification, images 68a (FIG. 6G) and 68b (FIG. 6H) are compared on the video monitor. At, for example, 200×, the operator may detect virtually no similarity between these images. FIG. 7 shows an image correlation of only about 3%. This denotes that the item is definitely not the purportedly authentic item, but rather a substitute. At the highest level of magnification, of about 200× to 1000×, only a fraction of a millimeter of the original artwork surface is being reviewed. At this level, between different prints of the same art work or between a genuine and a forged item, as examples, aberrations are the rule, not the exception.

It is also important at this level of magnification, and with the limited image reviewed, that the operator be sure the site reviewed on the art work 50a is completely accurate. The camera is zoomed into the final level of magnification by the operator in such a way that corrections are made as to lateral position if required as zooming progresses. The operator monitors the image as he zooms. This avoids migration away from the site of interest, which could lead to an erroneous finding of near-zero correlation. To optimize camera position during this process the operator may wish to scan the camera to include areas immediately adjacent to the image 68a (this is particularly true if high correlation was found at the second level of magnification, but almost no correlation at the third level). For these reasons, it can be seen that a careful review at each successive level is important to arriving at an accurate conclusion.

Once the final level of magnification has been achieved and successful visual correlation between objects and reference data exists, a machine correlation (sometimes referred to as autocorrelation) may be performed to quantify the degree of match between the object and the high-magnification reference image. A pixel-by-pixel correlation, performed by the host (central) computer, yields a numerical percentage correlation factor as represented in FIG. 7 and as discussed above. An example of an autocorrelation technique that can be used is "thumb tack correlation", known to those skilled in image correlation techniques. These autocorrelation techniques automatically compensate for any slight difference in frame position between reference and live image—differences not obvious to the human eye. One example of an autocorrelation technique (or cross correlation, if the images turn out to be different) is described in the text *Digital Image Processing*, by R. C. Gonzalez and R. E. Woods, Addison-Wesley Publishing Company 1992, pages 109, 110 and 111. In that text, a basic equation for a linear correlation technique is given at page 109, as equation 3.3–36:

$$f(x)^o g(x) = \int_{-\pi}^{\pi} f^*(\alpha) g(x+\alpha) \, d\alpha$$

where * is the complex conjugate, X is linear position and alpha is amplitude. The application of this general approach to the present situation is more like the discrete case given by Gonzalez and Woods in equation 3.3–39, essentially a summation for two dimensional correlation. The image correlation in the present invention is in effect a superimposition of f(x) to g(x) and then a translation to X and Y. The present system also preferably includes rotation to find the correct overlay position, and a third dimension which is magnification level, although these latter two steps can be performed manually/visually by the operator. If all done by machine, the latter two steps can be each be accomplished by multiple iterations.

For qualitative results, the system of the invention achieves autocorrelation preferably by taking the reference image and producing a reverse (negative) of the reference image, then superimposing that reverse image with the image being investigated. The superimposed images are reviewed pixel by pixel. If autocorrelation is found, the positive and negative images will produce a nearly perfect neutral grey, with all overlying values averaging to the grey. If the images are slightly offset or even rotated, certain recognizable patterns will emerge, leading the operator to take obvious corrective positioning steps.

These and other autocorrelation techniques are well known to those skilled in the field, and it should be pointed out that the requirements for this type of autocorrelation, between two still images, are far less demanding than those discussed in the reference text noted above, relating to finding the closest match between an unknown image and a set of known images, which can be employed in military applications.

After successful correlation has been achieved with the above process, the documentation of the verification procedure can be performed. This may include issuing of an authenticity certificate and/or other evidence that the verification has been performed and certifying that the article brought in for verification is indeed the article originally registered. If a certificate is issued, it preferably includes prints of low resolution images, at the highest magnification level, showing evidence of the correlation for the customer.

As noted above, the verification process typically is conducted using "in service" reference data. At the customer's request, a higher level of security can be achieved by going to virgin data, i.e. additional sets of reference points which have been stored in the central computer and were made a part of the registration record, but which have heretofore been unused for any verification. These virgin data, which are called into service at the customer's option, then become the "in service" reference data for future verification processes, and the previous in service data are discarded and not used further.

It should be understood that certain preferred features of the method and system of the invention as described above, although preferred, could be accomplished by alternative means. For example, the control of the registration process and also of the verification process, and the participation of operators at the local terminal and the central data storage location, can be varied. If the local station is connected by modem/telephone line or other communication link to the central location during these processes, the local operator can place the artwork or other item on the video stand, but all other aspects of the location and recording of images can be under the control of the central location operator, if desired. With computers at the local station and the central location connected, the video microscopic camera placement and movement can be controlled by the central location operator, with images selected by that operator and recorded. In that event, the local station operator merely observes the process on the video monitor, as can the customer. This arrangement can help assure security and a general consistency in the type of "signature" features which are selected for registration. Also, this can help assure a consistent judgment in the verification process, and through this arrangement a machine verification or autocorrelation verification can be performed via the central location and computer software contained at the central location, with the local operator observing the process.

On the other hand, the system and process can be under the control of the local station operator, if desired, preferably with the central location operator monitoring the registration and verification processes and having input to the local operator through the communication link. Approval of the central location operator can be required when the process steps at the local station have been completed, before the item in question is actually registered. Similarly, in the verification process the central location operator's approval should be required, if the verification steps are conducted at the local station.

In another variation of the system, the process of registration could be accomplished at the local verification station alone, without any communication link to the central data storage location at that time. A data storage disk can be generated at the local station, carrying all the registration data for the artwork or other item in question, and the disk or a copy of the disk can be sent to the central data storage location. Upon the need for a subsequent verification, a disk could be ordered from the central data storage location, to be sent to the local station, or more preferably, a communication link could be established at that time, so that the verification process could then be conducted at the central location with monitoring by the local operator, or by the local operator with monitoring by the central location operator. In this sense, in the claims the term "communication" is used in the context of sending data between the central location from the local verification station, and this term refers to sending such data either via a communication link or by physically transmitting a data disk or other storage device. Similarly, the term "communication link" refers to a telephone line/modem connection, a connection over dedicated lines, a satellite communication link, a ground-based wireless link or other appropriate type of link capable of transmitting data in both directions.

The term "microscopic" or "magnified" as used in the claims is intended to mean at least about 5 times magnified, as viewed by the operator, more preferably at least 10 times.

Although video is the preferred medium for the process of the invention, other media could be employed, so long as convenient, efficient storage is possible, preferably electronic storage such as magnetic storage or optical disk storage, and preferably with wire or wireless data transmission available and easy retrieval, cataloging and sorting of the data representing the images. It is an important feature of the invention that actual images are viewed, selected, and stored, and the computer equipment for handling these images should efficiently commit the images to electronic data storage as discussed previously.

The above described preferred embodiments are intended to illustrate the principles of the invention but without limiting its scope. Other embodiments and variations to these preferred embodiments will be apparent to those skilled in the art and may be made without departing from the essence and scope of the invention as defined in the claims.

We claim:

1. A method for registration and verification of items, to confirm whether an item is a particular unique item previously registered, comprising:

providing a central data storage location and a plurality of local stations, providing a data communication link between one of said local stations and the central data storage location, initially performing a registration procedure under the control of an operator at the central data storage location, on a particular unique item at said one local station by (1) placing the item on optical equipment enabling microscopic viewing both at the local station and at the central data storage location, and capable of recording microscopic images from the item, (2) selecting a microsite for imaging on the item by microscopically viewing the item and selecting the microsite, (3) recording at a microscopic level of magnification an image of a unique pattern of features at the selected microsite of the item, said unique pattern of features being intrinsic to the item itself without any addition to the item, and (4) in conjunction with the recording step, producing and electronically storing at the central data storage location, data representing the microsite image and containing the unique pattern of features, in a form capable of use in reproducing the microsite image, along with data representing the location of the selected microsite, and along with data identifying the item being registered, preventing unauthorized duplication, alteration or use of the stored data, at a time subsequent to the storing of the data at the central data storage location, performing a verification procedure by (a) recalling over a communication link the stored data from the central data storage location to a selected one of said local stations, (b) examining at said selected local station at a microscopic level of magnification a subject item purporting to be said particular unique item, at a site on the item corresponding in location to said selected microsite in accordance with the recalled data, (c) comparing the image of the microsite generated by local examination to the microsite image recalled from the central data storage location to determine whether the two microsite images match to a preselected degree, thereby determining whether the subject item is the same unique item, and (d) controlling the verification procedure from the central data storage location, including at least verifying said selected local station for access to the stored data before the stored data are recalled to the selected local station.

2. The method of claim 1, wherein the step of recording an image at a microscopic level of magnification is accomplished at a magnification of at least about 200 times as viewed by an operator.

3. The method of claim 1, wherein step (c) of comparing the two microsite images is accomplished by autocorrelation.

4. The method of claim 1, wherein step (c) of comparing the two microsite images is accomplished by an operator.

5. The method of claim 1, wherein the step of recording an image at a microscopic level of magnification is accomplished at a magnification of at least about 5 times as viewed by an operator.

6. The method of claim 1, wherein the step of recording an image at a microscopic level of magnification is accomplished at a magnification of at least about 10 times as viewed by an operator.

7. The method of claim 1, wherein the unique item is an item of fine art.

8. The method of claim 1, wherein the unique item is a limited edition print of an original work of art.

9. The method of claim 1, wherein the unique item is a postage stamp.

10. The method of claim 1, wherein the unique item is a piece of sculpture.

11. The method of claim 1, wherein the unique item is a piece of jewelry.

* * * * *